Feb. 23, 1960
V. L. STREETER
2,925,826
VARIABLE FLOW CONTROLLER
Filed Jan. 17, 1955
2 Sheets-Sheet 1
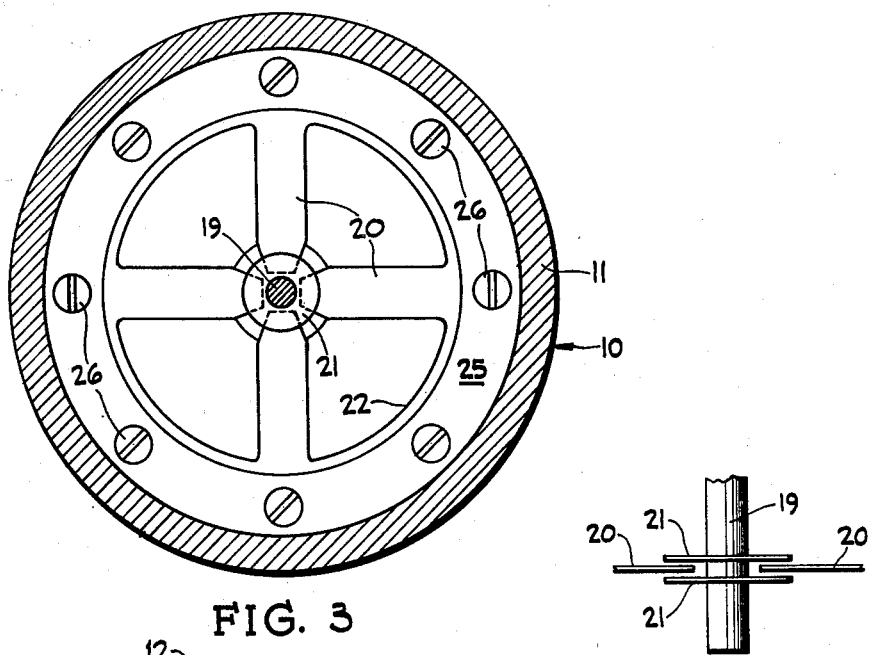
FIG. 3
FIG. 4
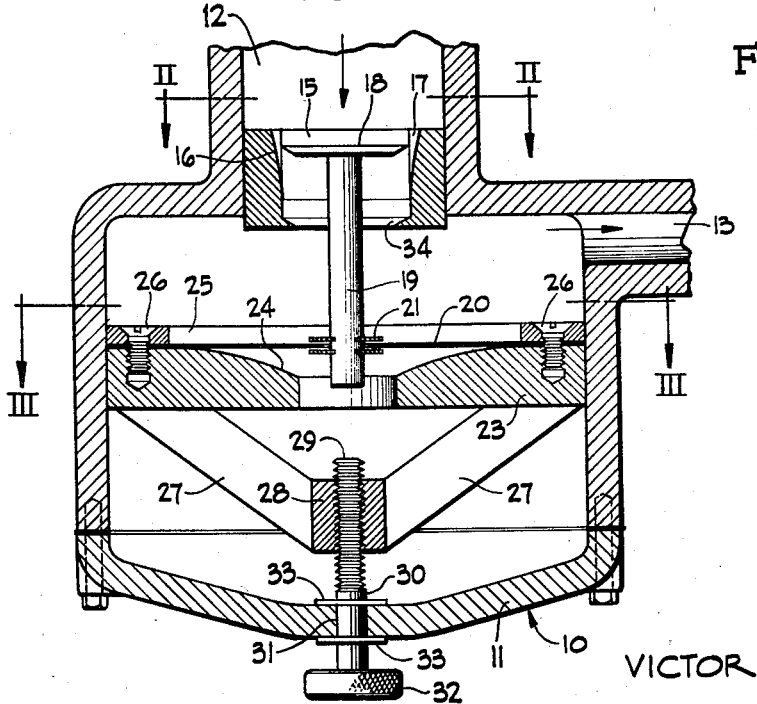
FIG. 1
INVENTOR
VICTOR L. STREETER
ATTORNEYS Feb. 23, 1960

V. L. STREETER 2,925,826

VARIABLE FLOW CONTROLLER

Filed Jan. 17, 1955

INVENTOR
VICTOR L. STREETER

BY

ATTORNEYS

United States Patent Office 2,925,826
Patented Feb. 23, 1960

2,925,826

VARIABLE FLOW CONTROLLER

Victor L. Streeter, Ann Arbor, Mich., assignor to The Dole Valve Company, Chicago, Ill., a corporation of Illinois Application January 17, 1955, Serial No. 482,092

8 Claims. (Cl. 137—517)

The present invention relates to a variable flow control device and more particularly to a flow control device which is adjustable to various flow rates of fluid through the device and which, when set, or adjusted, will maintain the flow rate therethrough substantially constant and substantially independent of fluid pressure and fluid pressure drop across the device.

The present invention more particularly relates to an adjustable flow control device and constitutes an improvement over the devices and controllers set forth in my copending parent application entitled "Adjustable Flow Control," U.S. Serial No. 446,867, filed July 30, 1954, of which this is a continuation-in-part, and my copending application entitled "Variable Flow Controller," Serial No. 482,157, filed on even date herewith.

One of the principal features of the present invention and its improvement over other similar operating devices as described in my copending applications, is that the present invention provides a control valve mechanism wherein an axially movable adjustable metering pin or control poppet is mounted on a single set of substantially free end cantilever leaf springs backed by a single contoured backing member and the poppet is reciprocally mounted in a contoured orifice nozzle so that the springs and orifice contour cooperate through the poppet to maintain the flow through the valve mechanism substantially constant and independent of fluid pressure at any desired flow rate within the design range of the device.

A valve structure embodying the principles of the present invention and enjoying general utility in flow systems which may be car heater valves on the one hand or shower bath valves on the other hand, or any other type of valve in a system for maintaining the flow through the system substantially constant, are, in accordance with the principles of this invention, much more economical to produce and highly simplified in their operation. Valve structures embodying the principles of this invention are adapted to utilize a modification and improvement of the contoured poppet as disclosed in my copending parent application and to further utilize an improved form of spring mounting and backing following the laws disclosed in my copending application filed on even date herewith.

It is, therefore, an object of the present invention to provide a new and improved contoured orifice structure operable as a contoured orifice for constant flow and further operable as a valve seat where it is desired to seal the valve.

Still another object of the present invention is to provide a new and improved backing and mounting structure for the substantially pure cantilever type springs for adjustable control of the mechanism to variably set the flow rate for the constant flow of valves.

Still another object of the present invention is to provide a new and improved flow control device wherein the poppet of the poppet and orifice type control is resiliently mounted on substantially pure cantilever leaf type springs and is adjustable axially thereof for adjustable positioning in a new and improved type poppet operable as a valve seat and as a contoured poppet for variable control of the flow through the device from maximum flow to zero flow.

Still other objects, features and advantages of the present invention will become readily apparent from the following detailed description of the present invention and an embodiment thereof, from the claims, and from the accompanying drawings, in which each and every detail shown is fully and completely disclosed as a part of this specification, in which like reference numerals refer to like parts, and in which:

Figure 1 is a full sectional view of an adjustable flow controller embodying the principles of the present invention;

Figure 3 is a transverse sectional view of the device of Fig. 1 and viewed substantially as taken along the line III—III of Fig. 1;

Figure 4 is an enlarged fragmental illustration of the region of the poppet where it is supported on the springs and the tip ends of the springs supporting the poppet;

Figure 2:
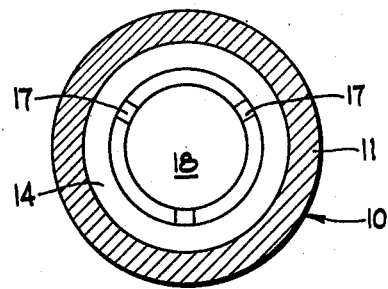
Figure 2 is a transverse sectional view taken substantially along the line II—II of Fig. 1 and further illustrating thereon quantitative dimensions illustrated for explanation of the laws of the contoured orifice.
Figure 6:
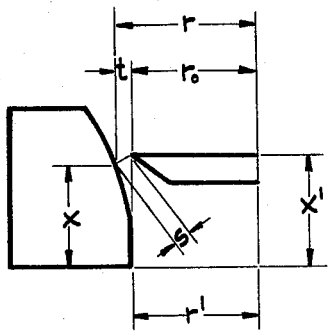
Figure 5:
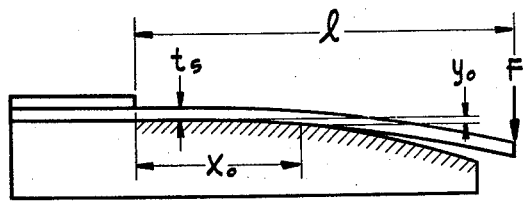

Figure 5 is an enlarged fragmental somewhat diagrammatic illustration of the backing member on one of the leaf springs illustrating the relation therebetween and the manner in which the successive portions of the spring lay down against the backing member under increasing force and further illustrating the quantitative dimensions utilized in developing the law which the spring and the backing member must follow in a device of this invention; and Figure 6 is a more or less enlarged diagrammatic illustration of the contoured orifice and the poppet and illustrating the quantitative dimensions thereof utilized in defining the law which the orifice must follow in a device embodying the principles of this invention.

As shown on the drawings:

There is illustrated in the drawings an adjustable variable flow control device 10 which is operable to maintain fluid flow therethrough substantially constant at any preselected rate of flow substantially independent of pressure variations and pressure drop variations. The valve 10 has a housing 11 formed in any suitable manner and of any suitable material, depending upon the fluid which is to flow through the device. An inlet 12 in the housing admits fluid thereto for passage through the valve mechanism to the outlet 13. Between the inlet and the outlet there is provided an orifice block 14 which, in the embodiment shown, is secured in the throat of the inlet 12 and is so secured therein that all fluid passing through the device must pass through the orifice or aperture 15 in the block 14. The orifice block 14 is profiled as at 16 with a preselected contour and surface of revolution that follows laws as set out in detail hereinbelow.

Extending radially inwardly from the profile or contoured face 16 of the block 14 are a plurality of guides 17 which guide the knife edge poppet plate 18 as it reciprocates axially within the block 14. These guides 17 are effective to maintain the knife edge poppet 18 centered within the orifice or aperture 15 in the block 14 so as to maintain the area between the block and the plate within its design considerations.

The valve poppet or knife edge metering pin 18 is mounted on a poppet pin 19 that is carried downstream thereof by a plurality of cantilever leaves 20 as illustrated in Fig. 4. These cantilever leaves 20, 20 have their tip ends extending to a region immediately adjacent to the pin 19 and extend between a pair of annular rings 21—21 secured to the pin 19 and axially spaced a distance sufficient to loosely accept the springs 20. The springs 20 are cantilever leaf type springs which, in a preferred construction, are integral with a spring ring 22 (Fig. 3) in such a manner that the combined spring ring and cantilever springs may be punched from a single sheet of resilient material. The spring ring 22, thus carrying the springs 20, is mounted on a contoured backing block 23 which has a profile contoured face 24 which is a surface of revolution in accordance with the hereinafter developed principles. At the radial outer extremity of the profiled face 24 on the block 23, the spring ring 22 is clamped between that region of the block 23 and a clamping ring 25 which is secured to the block by means of screws 26—26 or the like so that the springs are fixed on the block and support the pin 19 which carries the knife edge poppet plate 18. To support the block 23 within the housing 11, there is provided a spider support having arms 27—27 secured to the block 23 on the opposite side thereof from the contoured face 24, the spider having a threaded hub 28 which threadedly engages the threaded end 29 of a screw 30 extending through an appropriate aperture 31 in the housing. At the outer end of the screw 30 it carries an adjusting handle 32 for rotation of the screw and axial adjustment of the supporting structure and the springs and knife edge plate. The screw 30 is secured against axial movement by ring clips 33—33 on opposite faces of the housing 11 and fixed to the shaft or screw 30.

By adjustment of this mechanism through manipulation of the adjusting handle 32 on the screw shaft 30, the poppet plate 18 may be moved axially such as from a position shown therein to a position towards closing the valve where the area between the plate and the contour on the orifice block 14 will decrease, that is, by increasing or decreasing the dimension $x'$ in Fig. 6, to increase or decrease the area defined by the revolution of the dimension $s$. At the foot end or minimum area end of the contour 16 on the orifice block 14, there is provided a valve seat 34 whereby the valves may be actually closed or sealed against inlet fluid.

The foregoing operation of the valve structure of this invention, including such operation whereby fluid flow will be maintained constant between the knife edge poppet plate and the orifice, with the area decreasing as the pressure increases and vice versa, depends upon several laws and the cooperation thereof during operation of the valve. Still more particularly, it is important that the leaf cantilever springs and their backing member cooperate with each other so that the following relation may exist:

$$y = \frac{Y_0}{\ln H} \ln \frac{F_0 H}{F} = x' - z$$

wherein $h$ is the fluid head drop across the valve head,
$h_0$ is the minimum design head drop across the valve head,
$Y_0$ is the position of the springs for $h=h_0$,
$H$ is the ratio of maximum fluid head to minimum fluid head,
$F$ is the pressure force on the valve head, and
$F_0$ is the minimum design pressure force on the valve head.

This cooperative law between the spring and the profile, is developed in my copending parent application for patent filed July 30, 1954, Serial No. 446,867, entitled "Adjustable Flow Control." In my copending application for patent filed on even date herewith it is developed that the spring backing should be a surface of revolution defined by the section profile line $$\frac{1}{3}(1-\bar{x})^2 \frac{d^2\bar{y}}{d\bar{x}^2} + (1-\bar{x})\frac{d\bar{y}}{d\bar{x}} + \bar{y} = -\frac{3}{\ln H}\ln(1-\bar{x}) + \frac{F_0 l^3}{3EIY_0}$$

Which, when integrated, and solved for $\bar{y}$ is $$\bar{y} = \frac{1}{\ln H}\left[\frac{9}{2}(1-\bar{x}) - \frac{1}{2}(1-\bar{x})^3 - 3\ln(1-\bar{x}) - 4\right] + \frac{G\bar{x}^2}{2}(3-\bar{x})$$

wherein $$G = \frac{F_0 l^3}{3EIY_0}$$

and $Y_0$ is the poppet travel for head drop change from $h_0$ to $H_h$.

When the resilient support for the metering pin obeys these laws it also obeys the basic law for the discharge through the valve when cooperating with the profile obeying the basic law $$Q = Q_{\min}\, e^{\frac{Z \ln H}{2Y_0}}$$

and $$Q = C_D A_{\min} \sqrt{2gh_0}\, e^{\frac{Z \ln H}{2Y_0}}$$

wherein $C_D$ is the discharge coefficient, Q is the discharge, and A is the fluid flow area.

From these relations, it follows, as developed in my copending parent application, that the profile of the orifice is generally defined by $$C_D A = (C_D A)_{\min}\, e^{\frac{X' \ln H}{2Y_0}}$$

and still more particularly defined by $$x = \frac{2Y_0}{\ln H}\left\{\ln\left[\sqrt{2}\frac{\left(2r_0 + \frac{t}{\pi} - \frac{b'}{\pi}\right)}{(r'-r_0)\left(r'-r_0-\frac{b'}{\pi}\right)}\frac{Y_0}{\ln H}\sqrt{1-\sqrt{1-\left(\frac{t\ln H}{Y_0}\right)^2}}\right] - \frac{1}{2}\left[1-\sqrt{1-\frac{t\ln H^2}{Y_0}}\right]\right\}$$

Should it be found that the guide fins can be eliminated, then it follows that the profile of the orifice may be defined by $$x = \frac{2Y_0}{\ln H}\left\{\ln\left[2\sqrt{2}\frac{r_0+\frac{t}{2}}{r'^2-r_0^2}\frac{Y_0}{\ln H}\sqrt{1-\sqrt{1-\left(\frac{t\ln H}{Y_0}\right)^2}}\right] - \frac{1}{2}\left[1-\sqrt{1-\left(\frac{t\ln H}{Y_0}\right)^2}\right]\right\}$$

When the spring and spring backing follow the above laws in cooperation with a profiled orifice which also follows the laws set forth herefor immediately hereinabove, then the flow through the device will be substantially constant and substantially independent of pressure drop or varying fluid pressure across the device. It is understood, of course, that in accordance with the principles of the present invention this flow rate can be varied to any desired adjusted level within the design range of the device by operation of the adjusting screw for adjusting the position of the supporting spider and backing member and ultimately the position of the knife edge poppet plate within the profiled orifice.

It will be understood, also, that numerous variations and modifications may be made without departing from the true spirit and scope of the novel concepts and principles of this invention and I, therefore, intend to cover those modifications and variations.

I claim as my invention:

1. In a flow control device to maintain the flow rate of fluid in a fluid system substantially constant, a housing, a fluid inlet to said housing, a fluid outlet from said housing, a flow orifice member between said inlet and said outlet, said member having a contoured orifice therein for fluid flow therethrough, a substantially knife edge plate disposed in said orifice for resilient axial movement therein, substantially free end cantilever non-linear leaf springs supporting said plate to control flow of fluid between said plate and said contoured orifice, said springs being supported by a non-linear backing member, and an adjustable support structure adjustably arranged in said housing and threadably cooperating therein to adjust the position of the plate in the orifice and adjust the control of fluid flow rate to be maintained substantially constant, the non-linear backing plate having a surface of revolution in accordance with $$\bar{y} = \frac{1}{\ln H}\left[\frac{9}{2}(1-\bar{x}) - \frac{1}{2}(1-\bar{x})^3 - 3\ln(1-\bar{x}) - 4\right] + \frac{G\bar{x}^2}{2}(3-\bar{x})$$

wherein $$G = \frac{F_0 l^3}{3EIY_0}$$

in which:

$y_0$ is the axial coordinate of the backing plate surface
$Y_0$ is the travel of the plate
ln is the natural logarithm
H is the ratio of maximum fluid head to minimum fluid head
$l$ is the active length of the spring at force $F_0$
$x_0$ is the radial or lateral coordinate of backing plate surface
G is the spring characteristic
$F_0$ is the minimum design pressure force on the valve head and spring
E and I are the spring structure values
$\bar{y}$ is the ratio $y/Y_0$
$\bar{x}$ is the ratio $x_0/l$.

2. In a flow control device to maintain the flow rate of fluid in a fluid system substantially constant, a housing, a fluid inlet to said housing, a fluid outlet from said housing, a flow orifice member between said inlet and said outlet, said member having a contoured orifice therein of predetermined curvature, a substantially knife edge plate disposed in said orifice for resilient axial movement therein, and substantially free end cantilever non-linear spring means including leaf springs supporting said plate and a support for the leaf springs, said spring means having a predetermined non-linearity characteristic related to the curvature of the flow orifice member and complimentary thereto obtaining constant flow with varying head drop across the plate, adjustable support means supporting said spring means for variation of flow through said device, and means for adjusting the position of said support means parallel to the direction of flow to adjust the position of the plate in said orifice, the flow of fluid through the device being maintained substantially constant at the adjusted level by the cooperative non-linearity of the spring means and the contour of the orifice.

3. In a flow control device to maintain the flow rate of fluid in a fluid system substantially constant, a housing, a fluid inlet to said housing, a fluid outlet from said housing, a flow orifice member between said inlet and said outlet, said member having a contoured orifice therein of predetermined curvature for fluid flow therethrough, a substantially knife edge plate disposed in said orifice for resilient axial movement therein, substantially free end cantilever non-linear leaf springs supporting said plate to control flow of fluid between said plate and said contoured orifice, said springs being supported by a non-linear backing member obtaining for the springs a predetermined non-linearity characteristic, said backing member having a predetermined shape dependent on the shape of the orifice member and complementary thereto obtaining constant flow with head change, and an adjustable support structure adjustably arranged in said housing and threadably cooperating therein to adjust the position of the plate in the orifice to obtain a desired flow rate.

4. In a flow control device to maintain the flow rate of fluid in a fluid system substantially constant, a housing, a fluid inlet to said housing, a fluid outlet from said housing, a flow orifice member between said inlet and said outlet having an orifice therein, a poppet member disposed in said orifice member, one of said members adapted for resilient movement with respect to the other member, and one of said members having a contour of predetermined curvature with the other member having a substantially knife edge to define a flow throat therebetween, substantially free end cantilever non-linear leaf springs supporting said movable member to control the flow of fluid between the poppet and orifice member, a non-linear backing member for said springs obtaining for the springs a predetermined non-linearity characteristic, the non-linearity deflection characteristic of said springs dependent on the curvature of the contour of said curved member and being mutually complementary therewith obtaining constant flow with head change, a support structure adjustably arranged in said housing and connected to support the springs and backing member, and adjustment means connected to the support structure to adjust the relative axial position of the poppet member and orifice member to obtain a desired flow rate.

5. In a flow control device to maintain the flow rate of fluid in a fluid system substantially constant, a housing, a fluid inlet to said housing, a fluid outlet from said housing, a flow orifice member between said inlet and said outlet, said member having a contoured orifice therein of predetermined curvature for fluid flow therethrough, a substantially knife edge plate disposed in said orifice for resilient axial movement therein, substantially free end cantilever non-linear leaf springs supporting said plate to control flow of fluid between said plate and said contoured orifice, said springs being supported by a non-linear backing member obtaining for the springs a predetermined non-linearity characteristic, said backing member having a predetermined shape dependent on the shape of the orifice member and complementary thereto obtaining constant flow with head change, a support structure connected to said backing member and arranged in said housing for supporting the backing member and spring, and adjustment means connected to said support structure for adjustably changing the position of the support structure and supported springs and backing member within the housing to adjust the operating range of the plate within the orifice and obtain a desired flow rate.

6. In a flow control device to maintain the flow rate of fluid in a fluid system substantially constant, a housing, a fluid inlet to said housing, a fluid outlet from said housing, a flow orifice member between said inlet and said outlet, said member having a contoured orifice therein for fluid flow therethrough, a substantially knife edge plate disposed in said orifice for resilient axial movement therein, substantially free end cantilever non-linear leaf springs supporting said plate to control flow of fluid between said plate and said contoured orifice, said springs being supported by a non-linear backing member, and an adjustable support structure adjustably arranged in said housing and threadably cooperating therein to adjust the position of the plate in the orifice and adjust the control of fluid flow rate to be maintained substantially constant, the orifice profile being such as to obey the law $$Q = Q_{min} \, e^{\frac{z \ln H}{2Y_0}}$$

wherein:

Q is flow discharge
e is natural logarithm basis
ln is the natural logarithm
H is the ratio of maximum to minimum design head
$Y_0$ is the travel of the plate
z is the position of discharge adjustment.

7. In a flow control device to maintain the flow rate of fluid in a fluid system substantially constant, a housing, a fluid inlet to said housing, a fluid outlet from said housing, a flow orifice member between said inlet and said outlet, said member having a contoured orifice therein for fluid flow therethrough, a substantially knife edge plate disposed in said orifice for resilient axial movement therein, substantially free end cantilever non-linear leaf springs supporting said plate to control flow of fluid between said plate and said contoured orifice, said springs being supported by a non-linear backing member, and an adjustable support structure adjustably arranged in said housing and threadably cooperating therein to adjust the position of the plate in the orifice, and adjust the control of fluid flow rate to be maintained substantially constant, the orifice having a contour in accordance with $$x = \frac{2Y_0}{\ln H} \left\{ \ln \left[ 2\sqrt{2} \frac{r_0 + \frac{t}{2}}{r'^2 - r_0^2} \frac{Y_0}{\ln H} \sqrt{1 - \sqrt{1 - \left(\frac{t \ln H}{Y_0}\right)^2}} \right] - \frac{1}{2}\left[1 - \sqrt{1 - \left(\frac{t \ln H}{Y_0}\right)^2}\right] \right\}$$

wherein:

x is the axial coordinate of throat profile
$Y_0$ is the travel of the plate
ln is the natural logarithm
H is ratio of maximum to minimum fluid head
$r_0$ is plate radius
r' is maximum throat radius
t is $r - r_0$
b' is the total guide vane thickness.

8. In a flow control device to maintain the flow rate of fluid in a fluid system substantially constant, a housing, a fluid inlet to said housing, a fluid outlet from said housing, a flow orifice member between said inlet and said outlet, said member having a contoured orifice therein for fluid flow therethrough, a substantially knife edge plate disposed in said orifice for resilient axial movement therein, substantially free end cantilever non-linear leaf springs supporting said plate to control flow of fluid between said plate and said contoured orifice, said springs being supported by a non-linear backing member, and an adjustable support structure adjustably arranged in said housing and threadably cooperating therein to adjust the position of the plate in the orifice, and adjust the control of fluid flow rate to be maintained substantially constant, the orifice having a contour in accordance with $$x = \frac{2Y_0}{\ln H} \left\{ \ln \left[ 2\sqrt{2} \frac{r_0 + \frac{t}{2} - \frac{b'}{2\pi}}{(r' - r_0)\left(r' + r_0 - \frac{b'}{\pi}\right)} \frac{Y_0}{\ln H} \sqrt{1 - \sqrt{1 - \left(\frac{t \ln H}{Y_0}\right)^2}} \right] - \frac{1}{2}\left[1 - \sqrt{1 - \left(\frac{t \ln H}{Y_0}\right)^2}\right] \right\}$$

wherein:

x is the axial coordinate of throat profile
$Y_0$ is the travel of the plate
ln is the natural logarithm
H is ratio of maximum to minimum fluid head
$r_0$ is plate radius
r' is minimum throat radius
t is $r - r_0$ where r is throat radius.

References Cited in the file of this patent

UNITED STATES PATENTS

| | | |
|---|---|---|
| 1,658,547 | Aseltine | Feb. 7, 1928 |
| 1,904,337 | Turner | Apr. 18, 1933 |
| 1,944,088 | Linderoth | Jan. 16, 1934 |
| 2,368,051 | Kempton | Oct. 2, 1945 |

FOREIGN PATENTS

| | | |
|---|---|---|
| 595,243 | Germany | of 1934 |

OTHER REFERENCES

A.S.M.E. Transactions (Clurman), vol. 73, pub. by A.S.M.E. 1951, pp. 155–161. (Copy in Scientific Library.)